(12) United States Patent
Biskeborn et al.

(10) Patent No.: US 12,148,447 B1
(45) Date of Patent: Nov. 19, 2024

(54) HDD HEAD HAVING SAME GAP VERIFY AND SYSTEM FOR USING SAME

(71) Applicant: Western Digital Technologies, Inc., San Jose, CA (US)

(72) Inventors: Robert G. Biskeborn, Hollister, CA (US); David J. Seagle, Morgan Hill, CA (US); Diane L. Brown, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,078

(22) Filed: Aug. 1, 2023

Related U.S. Application Data (60) Provisional application No. 63/465,312, filed on May 10, 2023.

(51) Int. Cl.
*G11B 20/18* (2006.01)
*G11B 5/127* (2006.01)
*G11B 5/31* (2006.01)

(52) U.S. Cl.
CPC ........ *G11B 20/1879* (2013.01); *G11B 5/1278* (2013.01); *G11B 5/312* (2013.01)

(58) Field of Classification Search
None
See application file for complete search history.

(56) References Cited

U.S. PATENT DOCUMENTS

| | | | | |
|---|---|---|---|---|
| 5,870,249 | A  * | 2/1999 | Yanagisawa | G11B 5/596 |
| | | | | 360/246.7 |
| 6,044,056 | A  * | 3/2000 | Wilde | G02B 26/0866 |
| 6,216,529 | B1 * | 4/2001 | Burga | G11B 5/82 |
| 7,969,683 | B2 | 6/2011 | Santini | |
| 8,493,693 | B1 * | 7/2013 | Zheng | H01F 10/30 |
| | | | | 360/324.11 |
| 8,937,789 | B2 * | 1/2015 | Watanabe | G11B 5/315 |
| | | | | 360/122 |
| 10,249,339 | B1 | 4/2019 | Mendonsa et al. | |
| 10,818,317 | B1 | 10/2020 | Erden et al. | |
| 11,361,787 | B1 | 6/2022 | Mendonsa et al. | |
| 2001/0028536 | A1* | 10/2001 | Sugimoto | G11B 5/6005 |
| 2001/0030834 | A1* | 10/2001 | Kohira | G11B 21/21 |
| | | | | 360/235.8 |
| 2004/0257710 | A1 | 12/2004 | Limmer et al. | |
| 2005/0212363 | A1* | 9/2005 | Okubo | H02K 41/0356 |
| | | | | 310/12.26 |

(Continued)

*Primary Examiner* — Peter Vincent Agustin
(74) *Attorney, Agent, or Firm* — PATTERSON + SHERIDAN, LLP (57) ABSTRACT

The present disclosure generally relates to a magnetic recording device comprising a magnetic recording head. The magnetic recording device comprises a write head and a read head. The write head comprising a trailing shield, a main pole, and a leading shield, and the read head comprises a first shield, a second shield, and a magnetic sensor disposed between the first and second shields. In some embodiments, a shield is disposed between the leading shield and the first shield. A central axis of the write head is aligned with a central axis of the read head. The read head is spaced a distance of about 5 μm to about 20 μm from the write head such that the magnetic recording head is controllable to write data to a media using the write head and read verify the data using the read head.

25 Claims, 10 Drawing Sheets

(56) References Cited

U.S. PATENT DOCUMENTS

| | | | | |
|---|---|---|---|---|
| 2007/0133114 A1* | 6/2007 | Ishii | ............... | G11B 20/1816 |
| | | | | 360/53 |
| 2007/0230027 A1* | 10/2007 | Kawabe | ........... | G11B 20/10222 |
| | | | | 360/77.08 |
| 2007/0230046 A1* | 10/2007 | Le | ................ | G11B 5/1278 |
| 2008/0080081 A1* | 4/2008 | Toshihiko | .............. | G11B 5/455 |
| | | | | 360/324 |
| 2008/0232000 A1* | 9/2008 | Flint | ............... | G11B 5/112 |
| | | | | 360/319 |
| 2009/0168212 A1* | 7/2009 | Flechsig | ............... | G11B 5/455 |
| | | | | 360/25 |
| 2011/0146062 A1* | 6/2011 | Allen | ................ | G11B 5/3163 |
| | | | | 29/603.18 |
| 2011/0242696 A1* | 10/2011 | Ikeda | ................ | G11B 5/314 |
| | | | | 360/59 |
| 2013/0057980 A1* | 3/2013 | Shiimoto | ............... | G11B 5/314 |
| | | | | 360/110 |
| 2013/0329316 A1* | 12/2013 | Watanabe | .............. | G11B 5/315 |
| | | | | 360/78.04 |

\* cited by examiner

HDD HEAD HAVING SAME GAP VERIFY AND SYSTEM FOR USING SAME

CROSS-REFERENCE TO RELATED APPLICATIONS

This application claims benefit of U.S. provisional patent application Ser. No. 63/465,312, filed May 10, 2023, which is herein incorporated by reference.

BACKGROUND OF THE DISCLOSURE

Field of the Disclosure

Embodiments of the present disclosure generally relate to a magnetic recording drive comprising a magnetic recording head having read-after-write verification capabilities.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability or high error rates.

Often times, prior to writing data to a media or disk, the entire media is pre-scanned in order to map any defects that the media may have. Mapping the defects before writing data to the media prevents any data from being written to a location on the media that may be unable to store the data. However, as media capacities increase, such pre-scanning processes can be very time consuming, taking several hours or days to complete.

Moreover, after the defect mapping has been completed, data checks may still need to be performed periodically while writing data to the media to ensure the data is being accurately written and stored. In order to verify the data during the writing process, the writing process is stopped after one revolution or so, and then the data may be read-verified by the read head of the magnetic recording head. Because the writing process must be stopped in order to read-verify the data, throughput is significantly reduced, as once one track is completely written, the entire track must then be read.

Therefore, there is a need in the art for a magnetic recording system and magnetic recording head capable of read-verifying data quickly without decreasing throughput and without pre-scanning a media prior to writing data.

SUMMARY OF THE DISCLOSURE

The present disclosure generally relates to a magnetic recording device comprising a magnetic recording head. The magnetic recording device comprises a write head and a read head. The write head comprising a trailing shield, a main pole, and a leading shield, and the read head comprises a first shield, a second shield, and a magnetic sensor disposed between the first and second shields. In some embodiments, a shield is disposed between the leading shield and the first shield. A central axis of the write head is aligned with a central axis of the read head. The read head is spaced a distance of about 5 µm to about 20 µm from the write head such that the magnetic recording head is controllable to write data to a media using the write head and read verify the data using the read head.

In one embodiment, a magnetic recording head comprises a write head comprising: a trailing shield, a main pole disposed adjacent to the trailing shield, and a leading shield disposed adjacent to the main pole opposite the trailing shield, and a read head disposed adjacent to the write head, the read head comprising: a first shield disposed, the first shield being disposed adjacent to the leading shield, a second shield disposed, and a magnetic sensor disposed between the first shield and the second shield, wherein the read head is spaced a distance of about 5 µm to about 20 µm from the write head such that the magnetic recording head is controllable to write data to a media using the write head and read verify the data using the read head.

In another embodiment, a magnetic recording device comprises a magnetic recording head, the magnetic recording head comprising: a write head comprising: a trailing shield disposed at a media facing surface (MFS), a main pole disposed adjacent to the trailing shield at the MFS, and a leading shield disposed adjacent to the main pole opposite the trailing shield at the MFS, and a read head disposed adjacent to the write head, the read head comprising: a first shield disposed at the MFS, the first shield being disposed adjacent to the leading shield, a second shield disposed at the MFS, and a magnetic sensor disposed between the first shield and the second shield at the MFS, wherein the read head is spaced a distance of about 5 µm to about 20 µm from the write head, and wherein a central axis of the main pole is aligned with a central axis of the magnetic sensor, and a control unit coupled to the magnetic recording head, the control unit configured to control the magnetic recording head to write data to a media using the write head and read verify the data using the read head.

In yet another embodiment, a magnetic recording device comprises a magnetic recording head, the magnetic recording head comprising: a perpendicular magnetic recording (PMR) write head comprising: a trailing shield disposed at a media facing surface (MFS), a main pole disposed adjacent to the trailing shield at the MFS, and a leading shield disposed adjacent to the main pole opposite the trailing shield at the MFS, and a read head disposed adjacent to the write head, the read head comprising: a first shield disposed at the MFS, the first shield being disposed adjacent to the leading shield, a second shield disposed at the MFS, and a magnetic sensor disposed between the first shield and the second shield at the MFS, wherein: the read head is spaced a distance of about 5 µm to about 20 µm from the PMR write head such that the magnetic recording head is controllable to write data to a media using the PMR write head and read verify the data using the read head, and the magnetic recording head is tilted to a glide angle of about 80 microradians with respect to the media.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording device comprising a magnetic recording head. The magnetic recording device comprises a write head and a read head. The write head comprising a trailing shield, a main pole, and a leading shield, and the read head comprises a first shield, a second shield, and a magnetic sensor disposed between the first and second shields. In some embodiments, a shield is disposed between the leading shield and the first shield. A central axis of the write head is aligned with a central axis of the read head. The read head is spaced a distance of about 5 μm to about 20 μm from the write head such that the magnetic recording head is controllable to write data to a media using the write head and read verify the data using the read head.

Figure 1A:
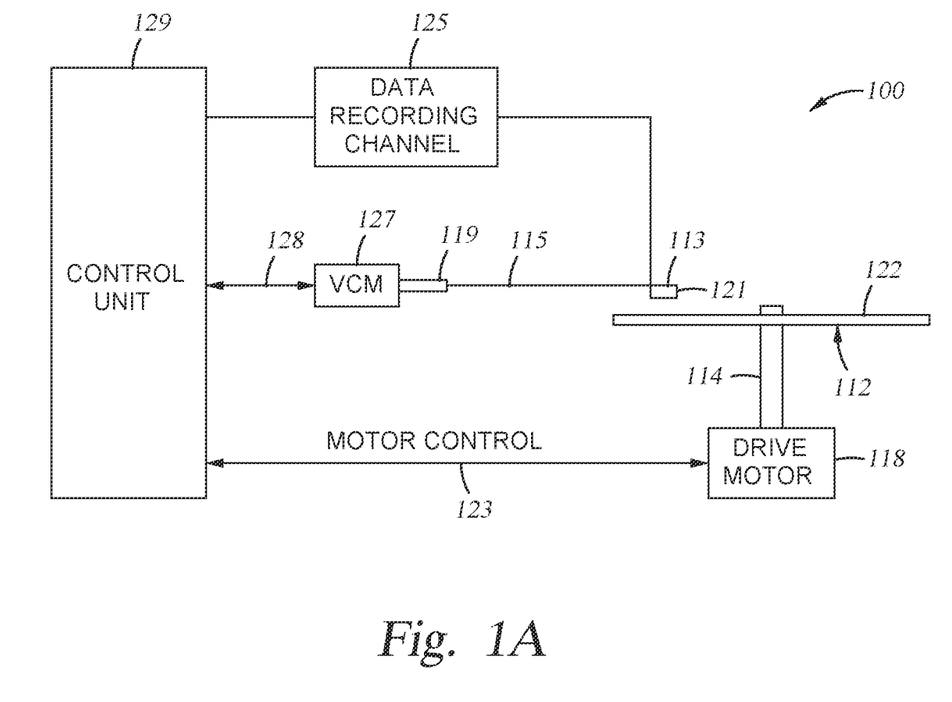
FIG. 1A illustrates a disk drive embodying this disclosure.
Figure 1B:
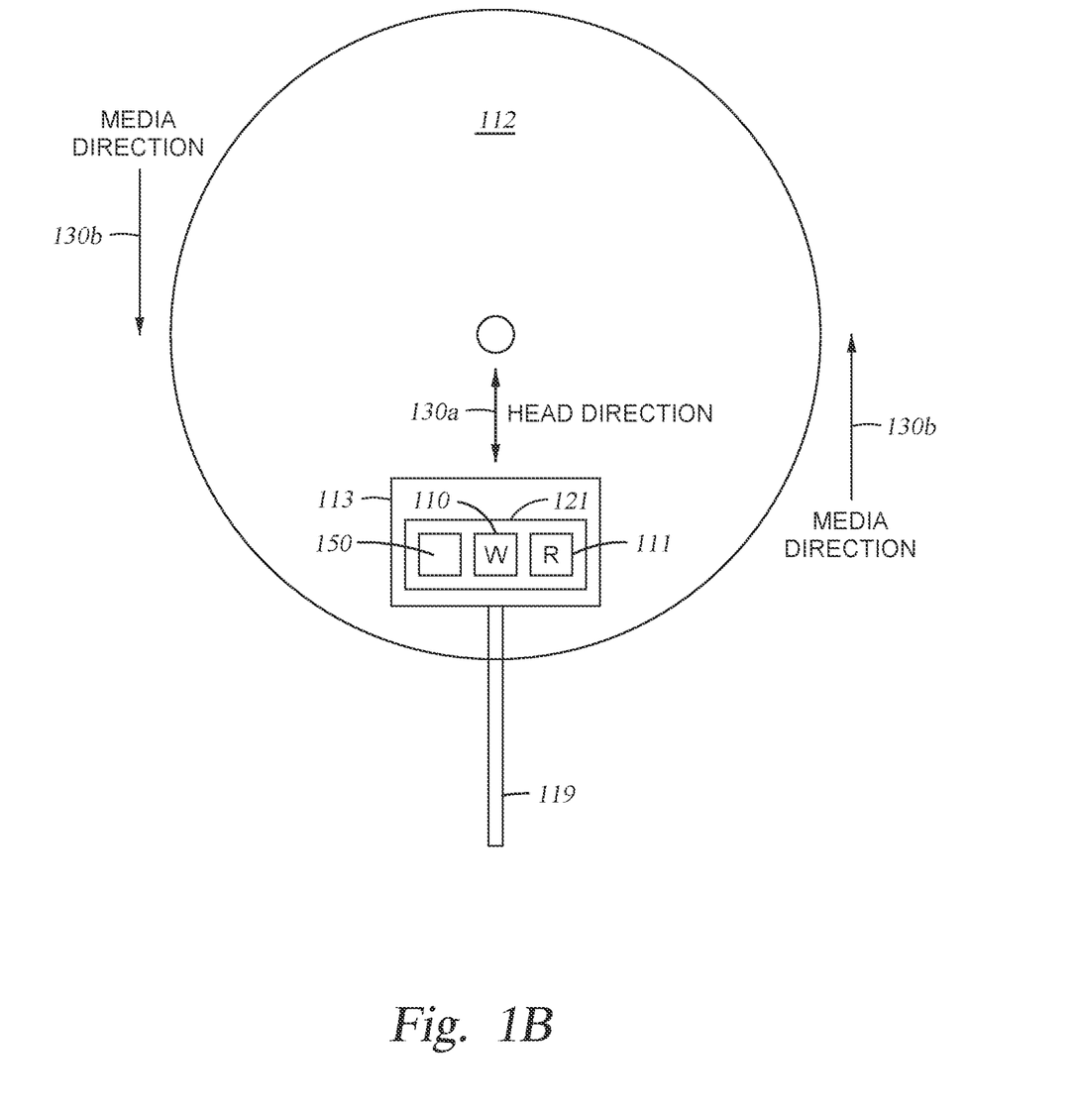
FIG. 1B illustrates a top view of the rotatable magnetic disk and head assembly of the disk drive of FIG. 1A, according to one embodiment.
Figure 1C:
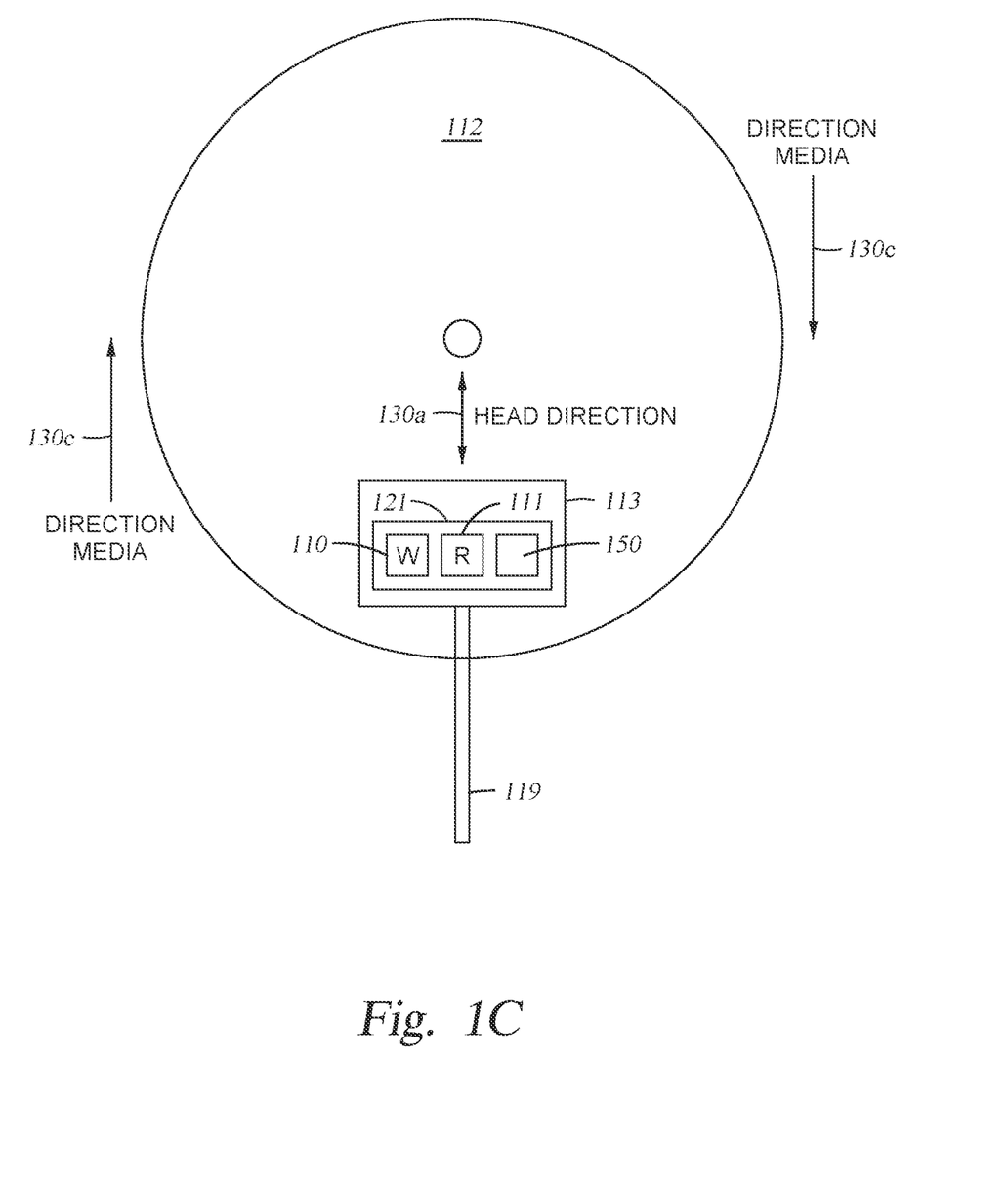
FIG. 1C illustrates a top view of the rotatable magnetic disk and head assembly of the disk drive of FIG. 1A, according to another embodiment.

FIG. 1A is a schematic illustration of a magnetic recording device 100, according to one implementation. FIG. 1B illustrates a top view of the rotatable magnetic disk and head assembly of the disk drive of FIG. 1A, according to one embodiment. FIG. 1C illustrates a top view of the rotatable magnetic disk and head assembly of the disk drive of FIG. 1A, according to another embodiment. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1A. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads, such as a write head 110 and a read head 111. As the rotatable magnetic disk 112 rotates, for example, in a counter-clockwise direction 130b like shown in FIG. 1B, or in the clockwise direction 130c like shown in FIG. 1C, the slider 113 moves linearly (e.g., via the actuation mechanisms described below) in a direction 130a back and forth from an inner portion of the disk 112 over the disk surface 122 to an outer portion of the disk 112 over the disk surface 122 so that the head assembly 121 may access different tracks of the rotatable magnetic disk 112 where desired data are written (i.e., the head assembly moves in a radially direction or manner). In FIG. 1B, a substrate or wafer 150 is disposed adjacent to a write head (W), and the rotatable magnetic disk 112 rotates in the counter-clockwise direction 130b. In FIG. 1C, a substrate or wafer 150 is disposed adjacent to a read head (R), and the rotatable magnetic disk 112 rotates in the clockwise direction 130c.

Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1A may be a voice coil motor (VCM). The VCM includes a coil movable within a fixed magnetic field, the direction and speed of the coil movements being controlled by the motor current signals supplied by a control unit 129. In the various embodiments described below, the movement of the slider, the movement of the media, and the timing and performing of reading, writing and verifying data, can be attributed to the control of the control unit 129 as an example even if not so explicitly stated.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

In some embodiments, the magnetic recording device 100 may be a "Jukebox" type of HDD comprising a plurality of magnetic disks 112 that are stored separately in a densely packed enclosure (not shown), and then transported and loaded into the magnetic recording device 100 as needed. An example of a "Jukebox" HDD is described in co-pending patent application titled "Archival Data Storage Library," U.S. application Ser. No. 17/402,370, filed Aug. 13, 2021, assigned to the same assignee of this application, which is herein incorporated by reference.

Figure 2A:
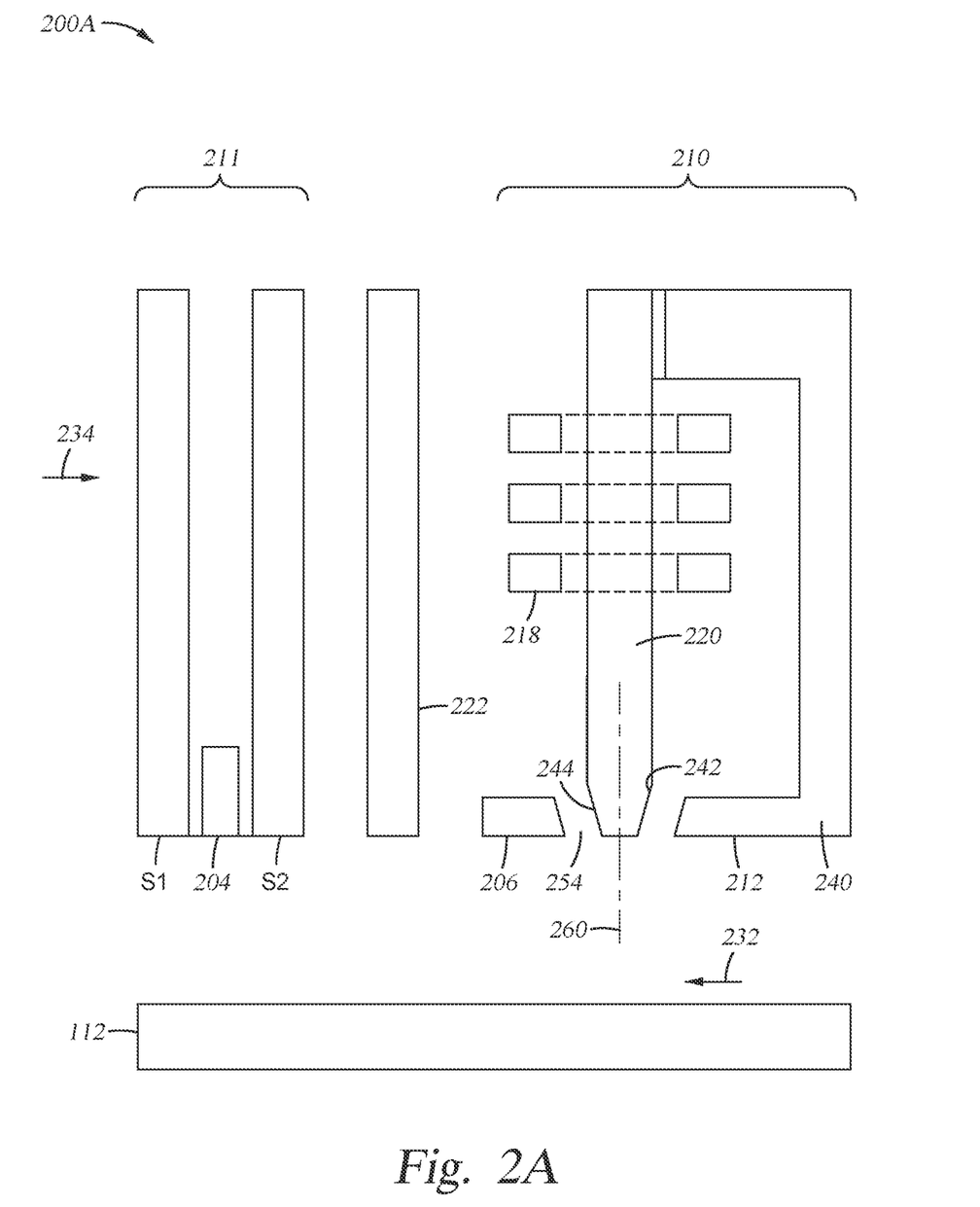
FIG. 2A is a fragmented, cross-sectional side view through the center of a read/write head facing a magnetic media, according to one embodiment.
Figure 2B:
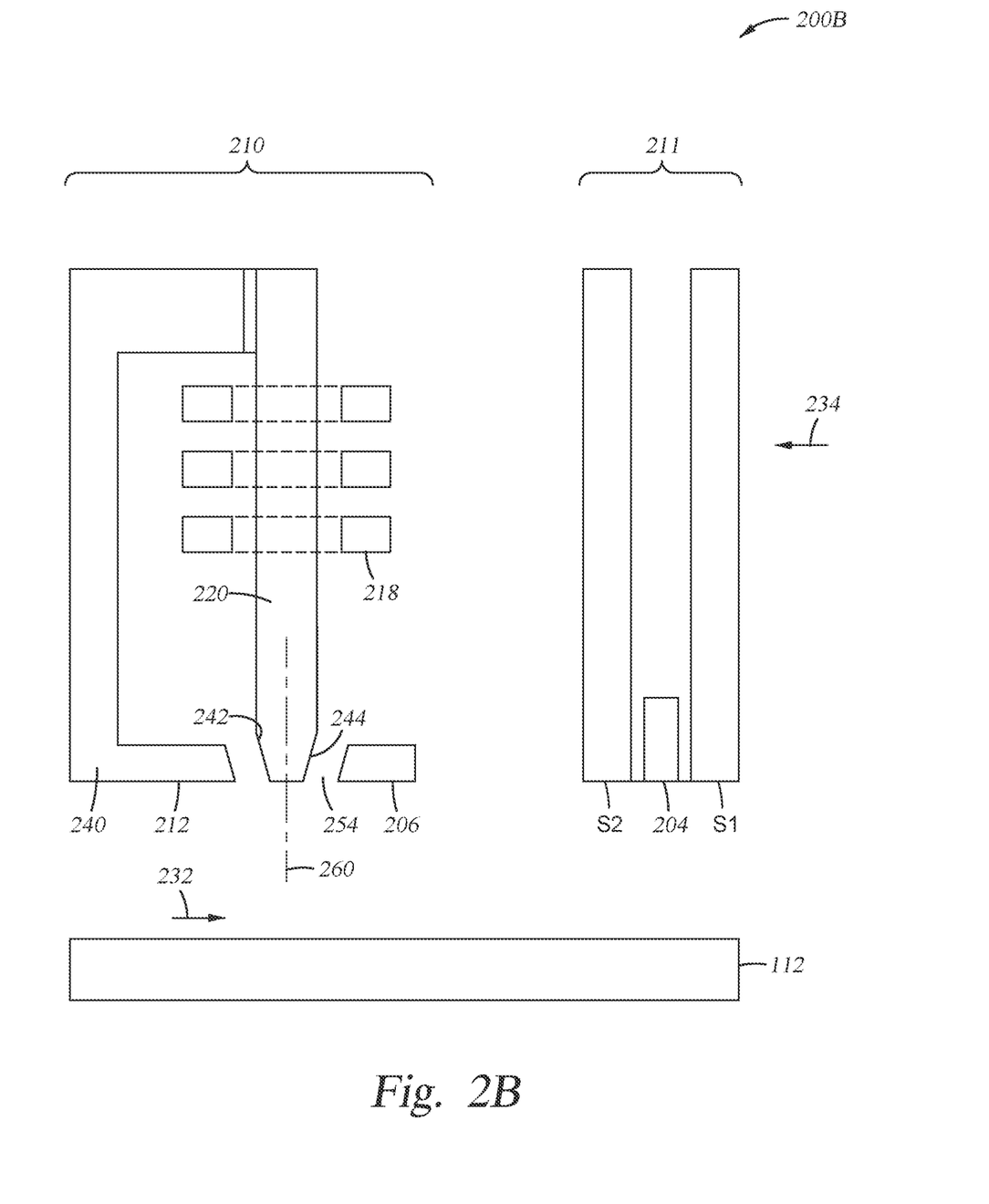
FIG. 2B is a fragmented, cross-sectional side view through the center of a read/write head facing a magnetic media, according to another embodiment.

FIG. 2A is a schematic illustration of a cross sectional side view of a head assembly 200A facing the rotatable magnetic disk 112 shown in FIG. 1A or other magnetic storage medium, according to one implementation. FIG. 2B is a schematic illustration of a cross sectional side view of a head assembly 200B facing the rotatable magnetic disk 112 shown in FIG. 1A or other magnetic storage medium, according to another implementation. The head assembly 200A and the head assembly 200B are the same; however, the location of the write head 210 and the read head 211 are reversed, as well as the direction of movement of the rotatable magnetic disk 112. In other words, the head assembly 200A and the head assembly 200B are mirror-images of one another. The head assembly 200A corresponds to FIG. 1B, and the head assembly 200B corresponds to FIG. 1C.

Each head assembly 200A, 200B may correspond to the head assembly 121 described in FIG. 1A. Each head assembly 200A, 200B includes a media facing surface (MFS) 212, such as an air bearing surface (ABS), facing the rotatable magnetic disk 112. As shown in FIG. 2A, the rotatable magnetic disk 112 relatively moves in the direction indicated by the arrow 232 and the head assembly 200A relatively moves in the direction indicated by the arrow 234. For example, in FIG. 2A, the magnetic disk 112 moves counter-clockwise while the head assemble 200A moves clockwise with respect to the disk 112. In FIG. 2B, the magnetic disk 112 moves clockwise while the head assemble 200A moves counter-clockwise with respect to the disk 112.

In one embodiment, which can be combined with other embodiments, the head assembly 200A includes a magnetic read head 211, which may be the read head 111 of FIG. 1B or FIG. 1C. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The sensing element 204 may be referred to herein as a magnetic sensor 204 or a sensor 204.

The head assembly 200A includes a write head 210, which may be the write head 110 of FIG. 1B or FIG. 1C. In one embodiment, which can be combined with other embodiments, the write head 210 includes a main pole 220, a leading shield 206, a trailing shield (TS) 240, and a spintronic device (not shown) disposed between the main pole 220 and the TS 240. The main pole 220 serves as a first electrode. Each of the main pole 220, the spintronic device, the leading shield 206, and the trailing shield (TS) 240 has a front portion at the MFS. The main pole 220 and the TS 240 are separated in an area by an insulating layer.

In some embodiments, like shown in FIG. 2A, a thin-film plate 222 is disposed between the S2 of the magnetic read head 211 and the leading shield 206 of the write head 210. The plate 222 is optional, and may be excluded, like shown in FIG. 2B. The plate 222 may comprise a magnetically permeable material, such as permalloy, and is configured to alter the amount and direction of magnetic flux in the read head 211. Alternatively, the plate 222 may comprise of an electrical conductive material, such as copper, to provide electrical isolation between the read head 211 and the write head 210. In another embodiment, the plate 222 may comprise laminations of permeable and conductive materials. In some embodiments, multiple plates 222 may be used, e.g., one permeable plate and one conductive plate, separated by a gap. The plate 222 may serve as a heat spreader, or as wear structure. In some embodiments, the plate 222 may be electrically connected to the substrate 150 (shown in FIGS. 1B and 1C), to the write head 210, or to the read head 211.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. In some embodiments, the coil 218 may be around the return pole of the TS 240. The leading shield 206 may provide electro-magnetic shielding and is separated from the main pole 220 by a leading gap 254.

Figure 3A:
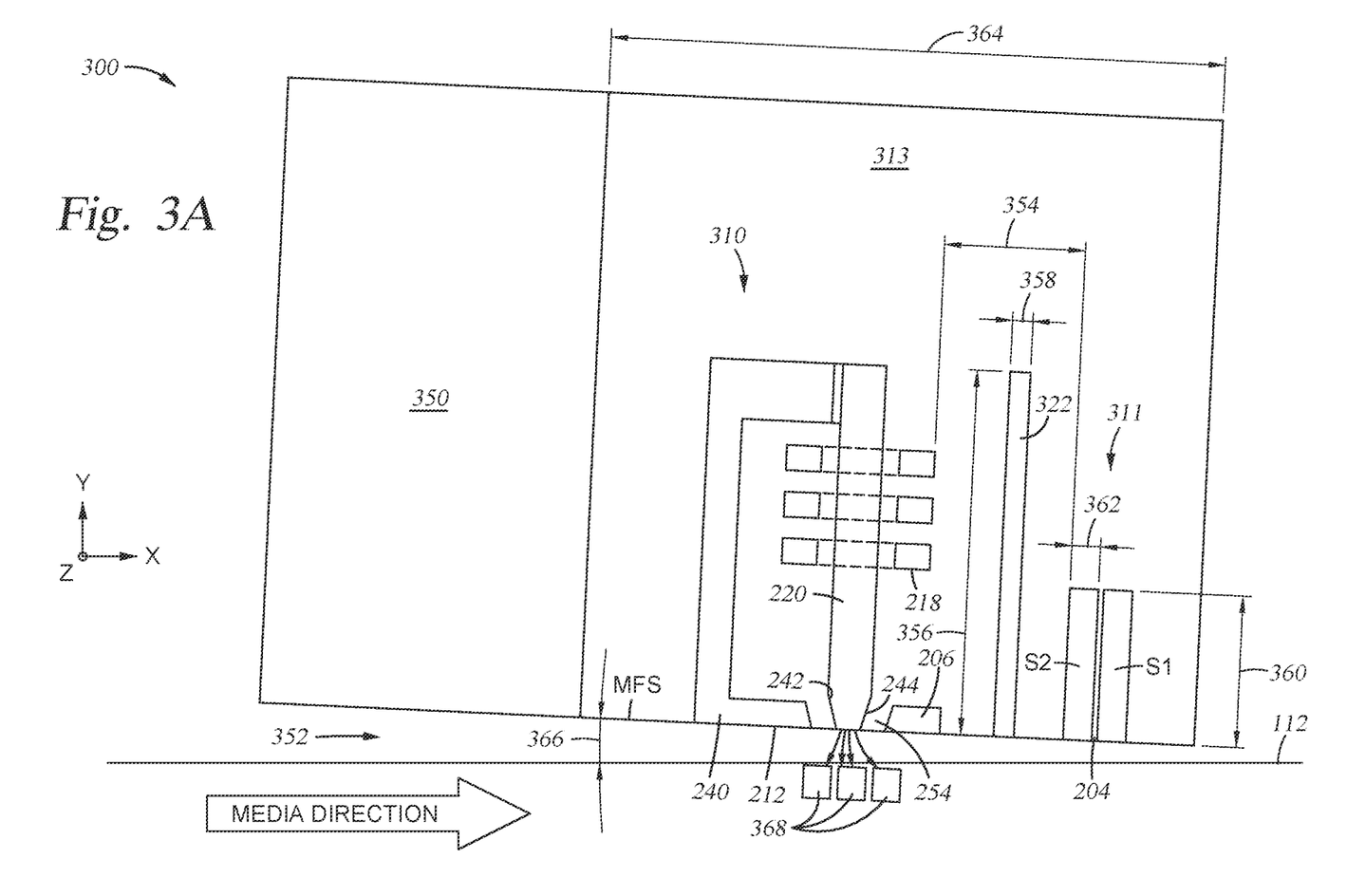
FIG. 3A illustrates cross-sectional view of a magnetic recording head having read-after-write verification capabilities, according to one embodiment.

FIG. 3A illustrates cross-sectional view of a magnetic recording head 300 having read-after-write verification capabilities, according to one embodiment. The magnetic recording head 300 may be utilized in the magnetic head assembly 121 described in FIGS. 1A-1C. In some embodiments, the magnetic head assembly 121 may comprise one or more magnetic recording heads 300. The magnetic recording head 300 may be the read/write head 200A of FIG. 2A or the read/write head 200B of FIG. 2B. The magnetic recording head 300 may be referred to herein as a same gap verify (SGV) head 300 or SGV head assembly 300. Aspects of the magnetic recording head 300 may not be drawn to scale, and are intended for illustrative purposes only.

The magnetic recording head 300 is disposed on a thin film 313 of a slider, such as the slider 113 of FIGS. 1A-1C. The thin film 313 of the slider has a width in the x-direction of about 10 μm to about 25 μm. The magnetic recording head 300 comprises a substrate or wafer 350, a write head 310 disposed adjacent to the substrate or wafer 350, an optional plate 322 disposed adjacent to the write head 310, and a read head 311 disposed adjacent to the optional plate 322. The substrate or wafer 350 may be the substrate or wafer 150 of FIGS. 1B-1C. In embodiments that do not include the optional plate 322, the write head 310 is disposed adjacent from the read head 311, like shown in FIGS. 3C-3D. The plate 322 is disposed adjacent to the leading shield 206 of the write head 310 and adjacent to the S2 of the read head 311. The write head 310 is spaced a distance 354 of about 5 μm to about 15 μm from the read head 311 in the x-direction (e.g., a direction parallel to the MFS).

The write head 310 may be the write head 210 of FIG. 2, comprising the main pole 220, the leading shield 206, the trailing shield 240, and the coils 218, among other components not labeled and/or shown. The plate 322 may be the plate 222 of FIG. 2. The read head 311 may be the read head 211 of FIG. 2, comprising the first shield S1, the second shield S2, and the magnetic sensor 204, among other components not labeled and/or shown. During operation, the S1 and S2 act as the electrical leads of the magnetic sensor 204 to sense the current through the magnetic sensor 204.

The substrate or wafer 350 has a width in the x-direction of about 1 mm or less. Each of the S1 and the S2 individually has a height 360 of about 5 μm to about 20 μm and a thickness 362 of about 1 μm or less. The plate 322 has a height 356 in the y-direction greater than or equal to a height 360 of the S1 and S2 of the read head 311, such as about 5 μm to about 30 μm. The plate 322 also has a thickness 358 in the x-direction of about 0.5 μm or greater.

The plate 322, S1, and S2 may each individually comprise permalloy and may be combined with Ir for wear resistance, for example. The plate 322 disposed between the write head 310 and the read head 311 produces a null signal for the read head 311, where writer flux created by the core and return sources of the coil 218 of the write head 310 experienced by the read head 311 results in no net rotation of the free layer of the magnetic sensor 204. As such, the plate 322 is placed in a region such that the writer flux at the read head 311 produces no net rotation of the free layer of the magnetic sensor 204, establishing a ratio of read signal to coupled writer signal amplitudes (e.g., signal to cross-talk ratio (SXR)) between about 20 dB to about 40 dB.

Additionally, one or more of the width, height, position or location, thickness, conductivity, and/or permeability of the plate 322 are adjusted or selected to produce or create the null signal. For example, a thicker plate 322 may need to be spaced closer to the write head 310 than to the read head 311, or centrally between the write head 310 and the read head 310, in order to create the null signal. As another example, a taller plate 322 may need to be spaced closer to the read head 311 than to the write head 310.

The write head 310 may be a PMR write head. In such an embodiment, the media 112 may comprise a soft magnetic underlayer (not shown) with a thin film magnetic medium (not shown) disposed thereon. As the main pole 220 of the write head 310 writes data to the media 112, magnetic flux travels down to the bits 368 of the media before being absorbed by the trailing shield 240. While not shown in FIG. 3A, the slider may be coupled to a linear actuator, such as the actuator arm 119 of FIGS. 1A-1C. The actuator may be a piezo actuator.

As shown in FIG. 3A, during writing and/or reading to the media 112, the magnetic recording head 300 is tilted to a glide angle 366 of about 80 micro-radians with respect to the media 112, forming a wedge-shaped gap 352 between the MFS of the magnetic recording head 300 and the media 112. Due to the wedge-shaped gap 352, the read head 311 is disposed closer to the media 112 than the write head 310. The wedge-shaped gap 352 allows air or other gases to flow between the MFS of the magnetic recording head 300 and the media 112, preventing the magnetic recording head 300 from contacting the media 112.

Due at least in part to the spacing 354 between the write head 310 and the read head 311, and the plate 322 creating the null region or null location for the read head 311, the write head 310 is able to write to the media 112, and the read head 311 is able to read the data to verify the data was written correctly. Thus, the write head 310 is able to write data to a portion of the tape, and the read head 311 is able to read verify the newly written portion of the media immediately. As such, the magnetic recording head 300 is able to write data to and read verify data from a media concurrently.

The plate 322 reduces magnetic cross-talk between the write head 310 and the read head 311 by creating the null region for the read head 311, enabling the write head 310 and the read head 311 to function concurrently. The plate 322 further helps cancel out the flux from the write coils 318 of the write head 310, enabling the amplitude of signals in the read head 311 that arise from coupling of magnetic flux from the write head 310 to be reduced or substantially less than the readback signal of the read head 311 itself. By utilizing the plate 322 to create a null region for the read head 311 (e.g., by canceling out the flux from the write head 310 experienced by the read head 311), and by adjusting magnetic design parameters, such as magnetic shield dimensions, coil design, and optionally deploying additional shielding between the write head 310 and the read head 311, a ratio of read signal to coupled writer signal amplitudes (e.g., signal to cross-talk ratio (SXR)) greater than about 20 dB or about 40 dB may be achieved.

As mentioned above, the magnetic recording head 300 is able to concurrently write and read data due in part to the separation distance 354 between the main pole 220 of a write head 310 and the magnetic sensor 204 of the read head 311. The main pole 220 and magnetic sensor 204 are spaced far enough apart that the amplitude of signals in the read head 311 that arise from coupling of magnetic flux from the write head 310 is reduced or substantially less than the readback signal of the read head 311 itself.

As used herein, the magnetic recording head 300 being able to "concurrently" write and read data refers to the fact that both the write head 310 and the read head 311 are concurrently turned "on" or able to operate simultaneously with respect to various data written to a media. However, it is to be noted that the write head 310 and the read head 311 are not "concurrently" operating on the same data at the same time. Rather, the write head 310 first writes data, and as the media moves with respect to the magnetic recording head 300, the read head 311 is then able to read verify the newly written data as the write head 310 concurrently writes different data to a different portion of the media. Furthermore, it is to be noted that a controller (not shown) may be configured to operate the magnetic recording head 300, and as such, the controller is configured to independently operate both the write head 310 and the read head 311. Thus, while the write head 310 is described as writing data and the read head 311 is described as reading the data, the controller may enable the write head 310 to write and enables the read head 311 to read.

As noted above, the magnetic recording head 300 may be the read/write head 200A of FIG. 2A. However, the positioning of the write head 310 and the read head 311 of the magnetic recording head 300 may be reversed like the read/write head 200B of FIG. 2B such that the write head 310 is disposed adjacent to the substrate or wafer 350. In other words, during fabrication of the magnetic recording head 300, the write head 310 is assembled adjacent to the substrate or wafer 350, the plate 322 is formed over the write head 310, and the read head 311 is assembled adjacent to the plate 322. However, the magnetic recording head 300 may still function as a SVG or read-after-write head if the positioning of the write head 310 and the read head 311 is switched so long as the direction the media moves is reversed as well.

Figure 3B:
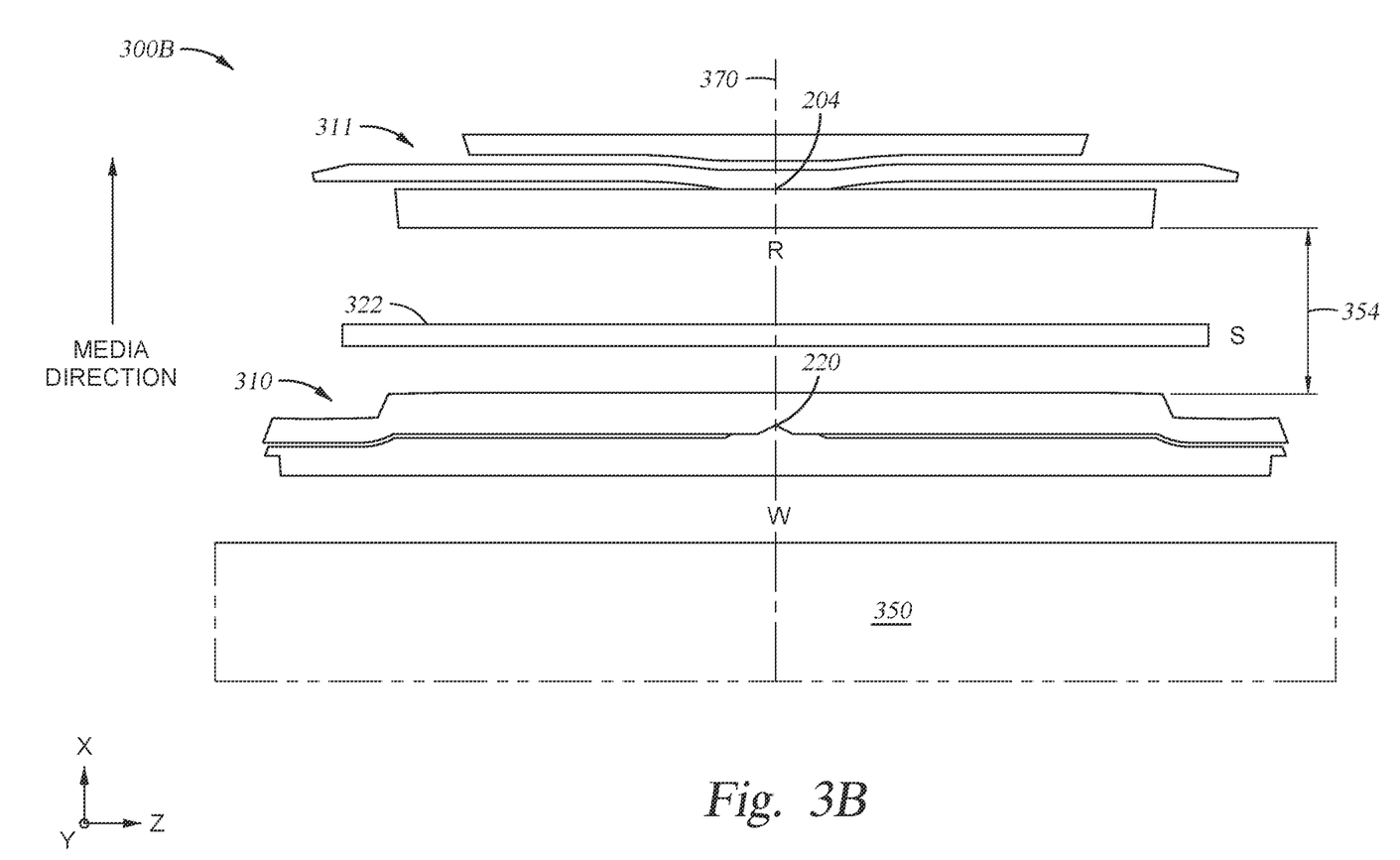
FIG. 3B illustrates a MFS view of the magnetic recording head of FIG. 3A, according to one embodiment.

FIG. 3B illustrates a MFS view of the magnetic recording head 300B of FIG. 3A, according to one embodiment. FIG. 3B illustrates a MFS view of the magnetic recording head 3000 of FIG. 3A, according to another embodiment. FIG. 3D illustrates a MFS view of the magnetic recording head 300D of FIG. 3A, according to yet another embodiment. FIG. 4 illustrates a MFS view of a conventional magnetic recording head 400 for comparison purposes. Each magnetic recording head 300B, 3000, and 300D may be the magnetic recording device 300 of FIG. 3A.

As shown in FIG. 3B, the main pole 220 of the write head 310 and the magnetic sensor 204 of the read head 311 are centered upon or aligned along a same central axis 370. The central axis 370 may be from a center of the main pole 220 to a center of the magnetic sensor 204. Additionally, the write head 310 is spaced a distance 354 of about 5 µm to about 20 µm from the read head 311 in the x-direction.

Figure 3C:
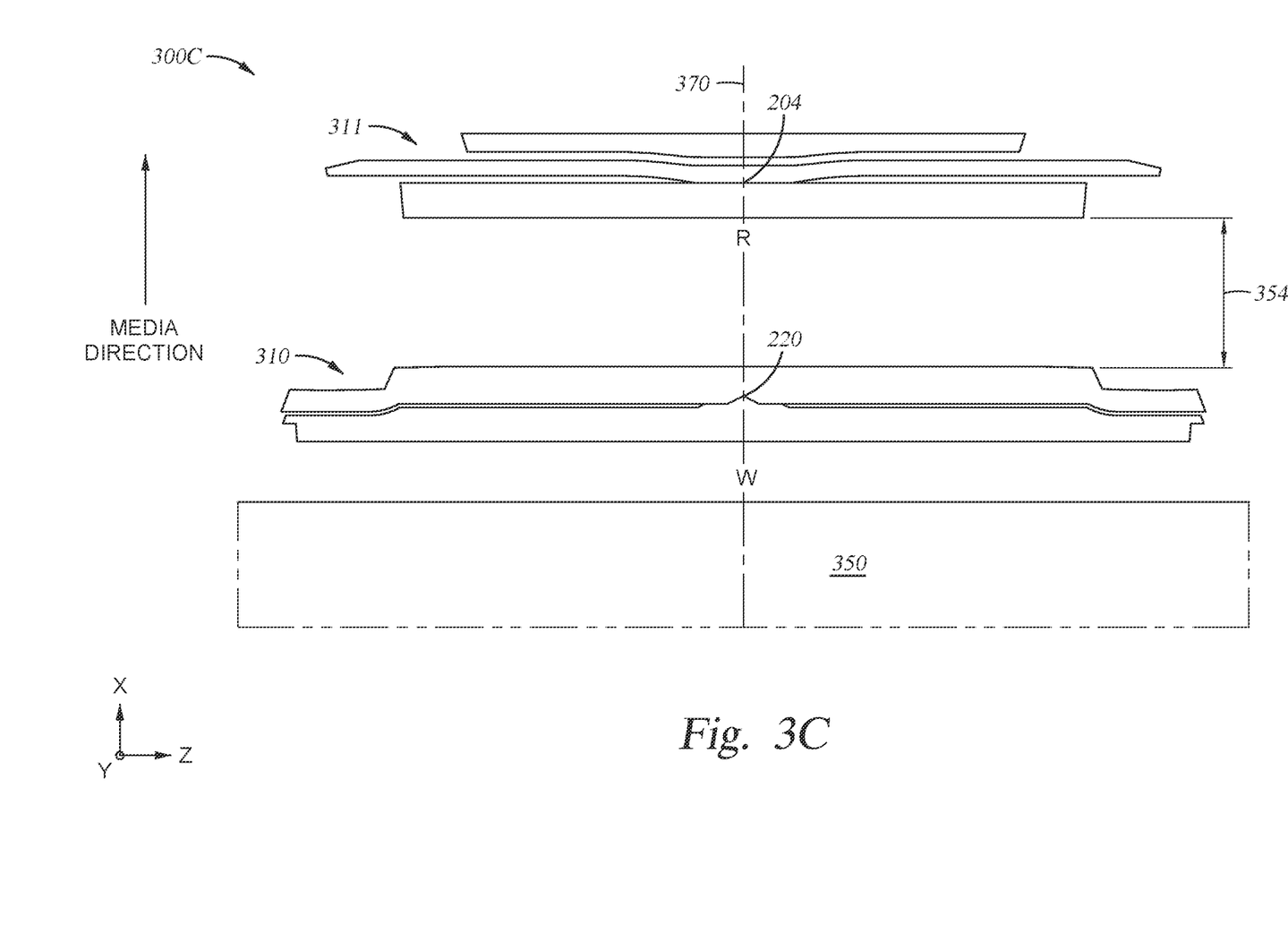
FIG. 3C illustrates a MFS view of the magnetic recording head of FIG. 3A, according to another embodiment.
Figure 3D:
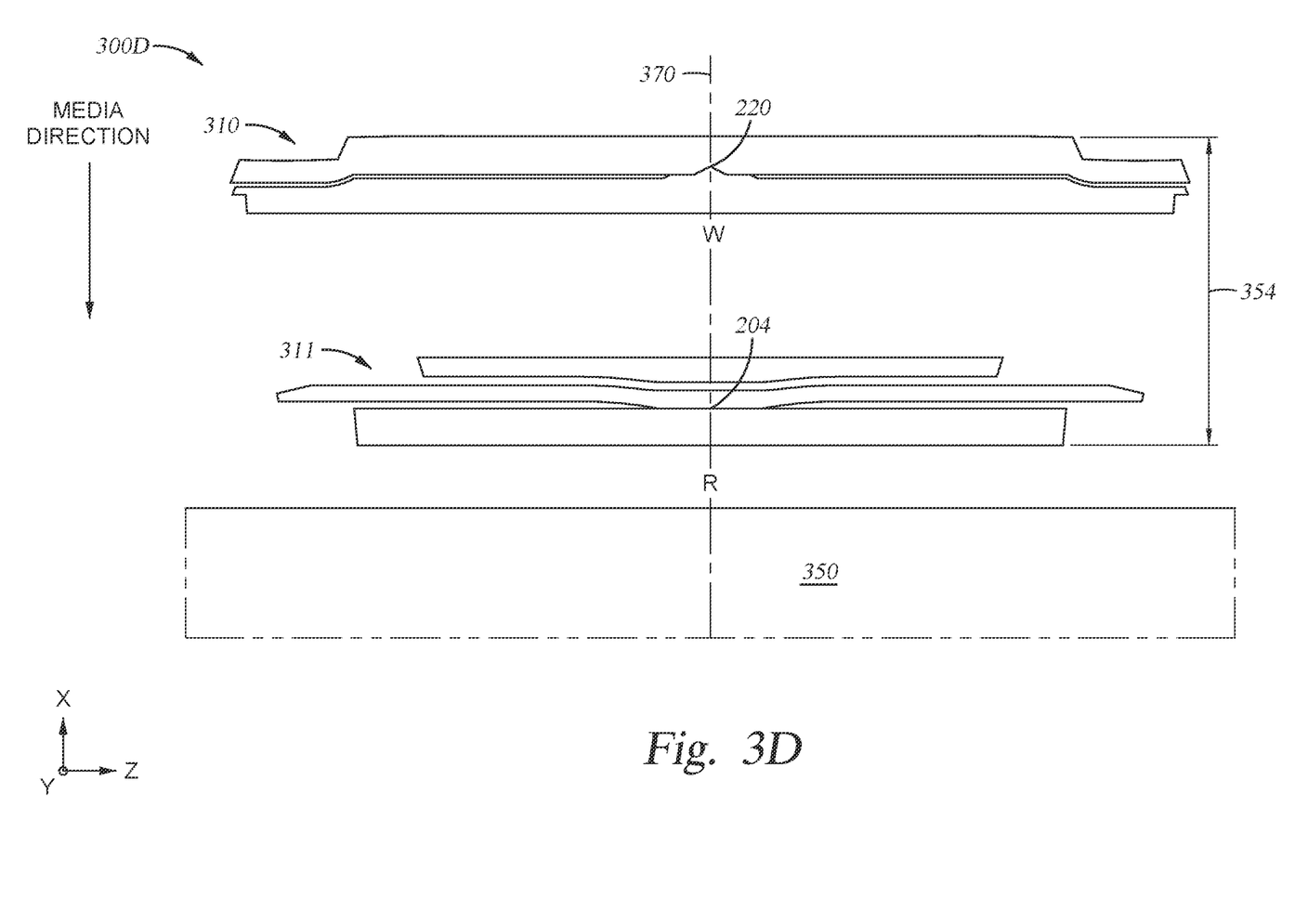
FIG. 3D illustrates a MFS view of the read/write head of FIG. 3A, according to yet another embodiment.
Figure 4:
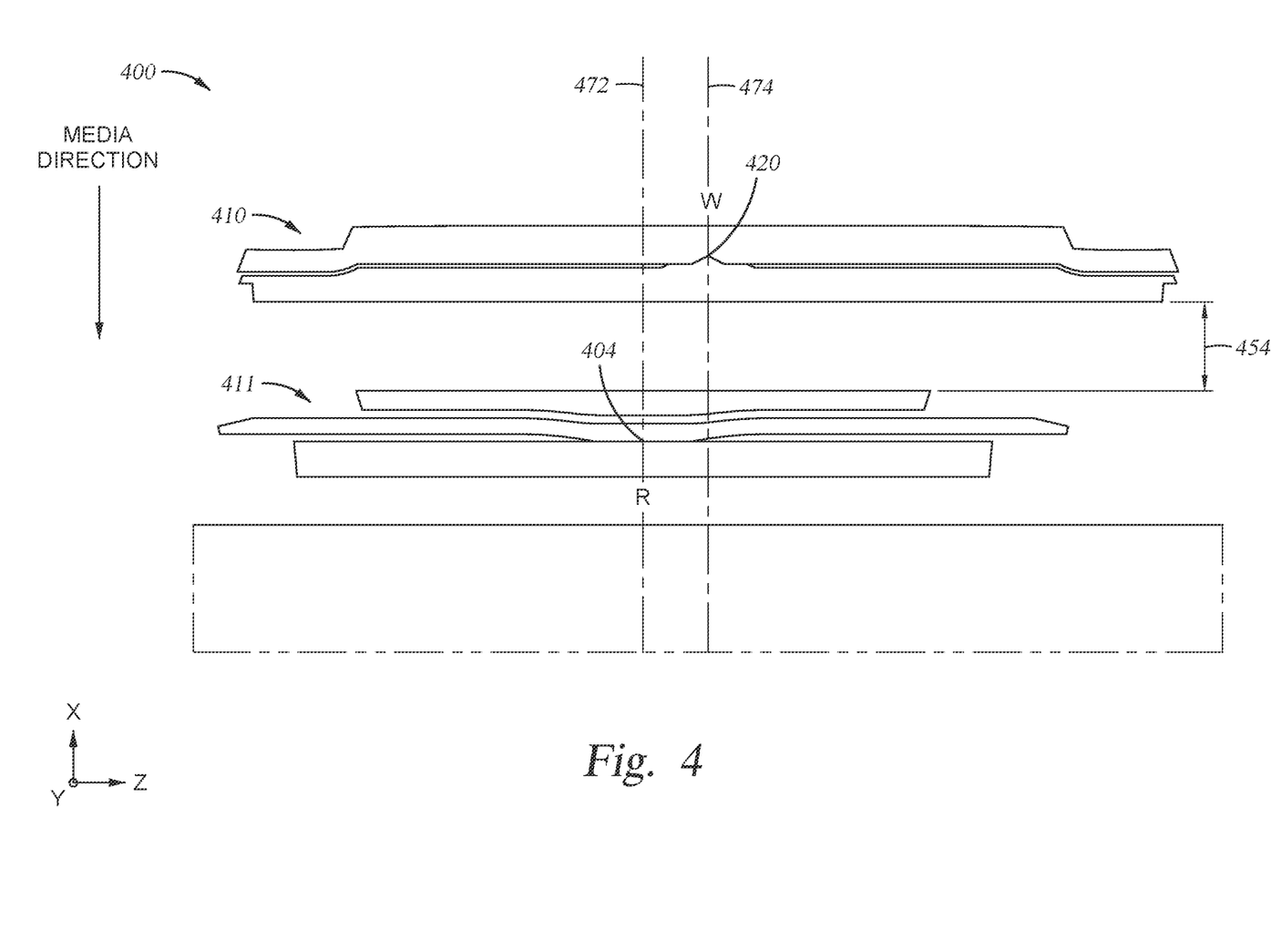
FIG. 4 illustrates a MFS view of a conventional magnetic recording head.

The magnetic recording head 3000 of FIG. 3C is the same as the magnetic recording head 300B of FIG. 3B; however, the optional plate 222 has been excluded.

The magnetic recording head 300D of FIG. 3D is the same as the magnetic recording head 3000 of FIG. 3C; however, the optional plate 222 has been excluded, and the positioning of the read head 311 and the write head 310 have been switched such that the read head 311 is disposed adjacent to the substrate or wafer 350. As such, the direction the magnetic media moves is reversed.

Conversely, in the conventional magnetic recording head 400, a center axis 472 of the read head 411 is offset or unaligned with a center axis 474 of the write head 410, and the direction the media moves is opposite to that shown in FIGS. 3B and 3C. Moreover, the write head 410 is spaced a distance 454 of about 2 µm to about 4 µm from the read head 411. As such, the read head 411 is spaced too close to the write head 410 to read-verify newly written data immediately after the write head 410 writes the data.

Therefore, by spacing the write head about 5 µm to about 15 µm from the read head, a magnetic recording head is about to write data to a portion of a media, and to immediately read verify the newly written portion of the media, resulting in reduced error rates. In embodiments comprising a shield disposed between a write head and a read head, the shield is able to block magnetic flux from the write head such that the magnetic flux does not interfere with the read head, further enabling the read head to immediately read verify newly written data. As such, the magnetic recording head is able to write data to and read verify data from a media concurrently.

Moreover, in some embodiments, when utilized as part of a "Jukebox" HDD, where the media are transported to the recording device and swapped out as needed, pre-shipping testing of the media to map out defects does not need to be performed, as the magnetic recording head is able to read-verify any written data, which is both most cost and time efficient. The same approach can be taken in another embodiment of a recording device where the media are provided in the same enclosure as the recording head as described above.

In one embodiment, a magnetic recording head comprises a write head comprising: a trailing shield, a main pole disposed adjacent to the trailing shield, and a leading shield disposed adjacent to the main pole opposite the trailing shield, and a read head disposed adjacent to the write head, the read head comprising: a first shield disposed, the first shield being disposed adjacent to the leading shield, a second shield disposed, and a magnetic sensor disposed between the first shield and the second shield, wherein the read head is spaced a distance of about 5 µm to about 20 µm from the write head such that the magnetic recording head is controllable to write data to a media using the write head and read verify the data using the read head.

The magnetic recording head further comprises a shield disposed between the write head and the read head. The shield is disposed between the leading shield and the first shield. The shield has a height greater than or equal to a height of the first shield and the second shield. The magnetic recording head is tilted to a glide angle of about 80 microradians with respect to the media. The write head is a perpendicular magnetic recording write head. A central axis of the write head is aligned with a central axis of the read head. A magnetic recording device comprising the magnetic recording head. The magnetic recording head further comprises a substrate, wherein the trailing shield is disposed adjacent to the substrate, and wherein the media moves in a counter-clockwise direction. The magnetic recording head further comprises a substrate, wherein the second shield is disposed adjacent to the substrate, and wherein the media moves in a clockwise direction. The magnetic recording device further comprises a linear actuator, wherein the magnetic recording head is disposed on the linear actuator, and wherein the linear actuator is configured to move in a linear direction over the media such that the magnetic recording head moves in a radial direction with respect to the media.

In another embodiment, a magnetic recording device comprises a magnetic recording head, the magnetic recording head comprising: a write head comprising: a trailing shield disposed at a media facing surface (MFS), a main pole disposed adjacent to the trailing shield at the MFS, and a leading shield disposed adjacent to the main pole opposite the trailing shield at the MFS, and a read head disposed adjacent to the write head, the read head comprising: a first shield disposed at the MFS, the first shield being disposed adjacent to the leading shield, a second shield disposed at the MFS, and a magnetic sensor disposed between the first shield and the second shield at the MFS, wherein the read head is spaced a distance of about 5 µm to about 20 µm from the write head, and wherein a central axis of the main pole is aligned with a central axis of the magnetic sensor, and a control unit coupled to the magnetic recording head, the control unit configured to control the magnetic recording head to write data to a media using the write head and read verify the data using the read head.

The magnetic recording device further comprises a third shield disposed between the write head and the read head, and wherein the read head is disposed in a null region created by the third shield where flux from the write head is absorbed. The magnetic recording head is tilted to a glide angle of about 80 micro-radians with respect to the media, and wherein the read head is disposed closer to the media than the write head. The magnetic recording device further comprises a third shield disposed between the write head and the read head, and wherein the third shield has a height greater than or equal to a height of the first shield and the second shield. The third shield has a thickness greater than or equal to a thickness of the first shield and the second shield. The magnetic recording head further comprises a substrate, wherein the trailing shield is disposed adjacent to the substrate, and wherein the control unit is configured to move the media moves in a counter-clockwise direction. The magnetic recording head further comprises a substrate, wherein the second shield is disposed adjacent to the substrate, and wherein the control unit is configured to move the media moves in a clockwise direction. The magnetic recording device further comprises a linear actuator, wherein the magnetic recording head is disposed on the linear actuator, and wherein the control unit is configured to move the linear actuator in a linear direction over the media such that the magnetic recording head moves in a radial direction with respect to the media.

In yet another embodiment, a magnetic recording device comprises a magnetic recording head, the magnetic recording head comprising: a perpendicular magnetic recording (PMR) write head comprising: a trailing shield disposed at a media facing surface (MFS), a main pole disposed adjacent to the trailing shield at the MFS, and a leading shield disposed adjacent to the main pole opposite the trailing shield at the MFS, and a read head disposed adjacent to the write head, the read head comprising: a first shield disposed at the MFS, the first shield being disposed adjacent to the leading shield, a second shield disposed at the MFS, and a magnetic sensor disposed between the first shield and the second shield at the MFS, wherein: the read head is spaced a distance of about 5 µm to about 20 µm from the PMR write head such that the magnetic recording head is controllable to write data to a media using the PMR write head and read verify the data using the read head, and the magnetic recording head is tilted to a glide angle of about 80 micro-radians with respect to the media.

The read head is disposed closer to the media than the PMR write head. The magnetic recording device further comprises a third shield disposed between the write head and the read head, and wherein the third shield has a height greater than or equal to a height of the first shield and the second shield, and wherein one or more of a position between the PMR write head and the read head, a width, a height, a thickness, and a permeability of the third shield is selected to create a null region. A central axis of the main pole is aligned with a central axis of the magnetic sensor. The magnetic recording head further comprises a control unit and a substrate, wherein the trailing shield is disposed adjacent to the substrate, and wherein the control unit is configured to move the media moves in a counter-clockwise direction. The magnetic recording head further comprises a control unit and a substrate, wherein the second shield is disposed adjacent to the substrate, and wherein the control unit is configured to move the media moves in a clockwise direction. The magnetic recording device further comprises a control unit and a linear actuator, wherein the magnetic recording head is disposed on the linear actuator, and wherein the linear actuator is configured to move the linear actuator in a linear direction over the media such that the magnetic recording head moves in a radial direction with respect to the media.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a write head comprising:
   a trailing shield;
   a main pole disposed adjacent to the trailing shield; and
   a leading shield disposed adjacent to the main pole opposite the trailing shield; and
   a read head disposed adjacent to the write head, the read head comprising:
   a first shield disposed adjacent to the leading shield;
   a second shield disposed adjacent to the first shield; and
   a magnetic sensor disposed between the first shield and the second shield, wherein the read head is spaced a distance of about 5 µm to about 20 µm from the write head such that the magnetic recording head is controllable to write data to a media using the write head and read verify the data using the read head.

2. The magnetic recording head of claim 1, further comprising a third shield disposed between the write head and the read head.

3. The magnetic recording head of claim 2, wherein the third shield is disposed between the leading shield and the first shield.

4. The magnetic recording head of claim 2, wherein the third shield has a height greater than or equal to a height of the first shield and the second shield.

5. The magnetic recording head of claim 1, wherein the magnetic recording head is tilted to a glide angle of about 80 micro-radians with respect to the media.

6. The magnetic recording head of claim 1, wherein the write head is a perpendicular magnetic recording write head.

7. The magnetic recording head of claim 1, wherein a central axis of the write head is aligned with a central axis of the read head.

8. A magnetic recording device comprising the magnetic recording head of claim 1.

9. The magnetic recording device of claim 8, wherein the magnetic recording head further comprises a substrate, wherein the trailing shield is disposed adjacent to the substrate, and wherein the media moves in a counter-clockwise direction.

10. The magnetic recording device of claim 8, wherein the magnetic recording head further comprises a substrate, wherein the second shield is disposed adjacent to the substrate, and wherein the media moves in a clockwise direction.

11. The magnetic recording device of claim 8, further comprising a linear actuator, wherein the magnetic recording head is disposed on the linear actuator, and wherein the linear actuator is configured to move in a linear direction over the media such that the magnetic recording head moves in a radial direction with respect to the media.

12. A magnetic recording device, comprising:
a magnetic recording head, the magnetic recording head comprising:
a write head comprising:
a trailing shield disposed at a media facing surface (MFS);
a main pole disposed adjacent to the trailing shield at the MFS; and
a leading shield disposed adjacent to the main pole opposite the trailing shield at the MFS; and
a read head disposed adjacent to the write head, the read head comprising:
a first shield disposed at the MFS, the first shield being disposed adjacent to the leading shield;
a second shield disposed at the MFS; and
a magnetic sensor disposed between the first shield and the second shield at the MFS, wherein the read head is spaced a distance of about 5 μm to about 20 μm from the write head, and wherein a central axis of the main pole is aligned with a central axis of the magnetic sensor; and
a control unit coupled to the magnetic recording head, the control unit configured to control the magnetic recording head to write data to a media using the write head and read verify the data using the read head.

13. The magnetic recording device of claim 12, further comprising a third shield disposed between the write head and the read head, wherein the read head is disposed in a null region created by the third shield where flux from the write head is absorbed.

14. The magnetic recording device of claim 12, wherein the magnetic recording head is tilted to a glide angle of about 80 micro-radians with respect to the media, and wherein the read head is disposed closer to the media than the write head.

15. The magnetic recording device of claim 12, further comprising a third shield disposed between the write head and the read head, wherein the shield has a height greater than or equal to a height of the first shield and the second shield, and wherein the third shield has a thickness greater than or equal to a thickness of the first shield and the second shield.

16. The magnetic recording device of claim 12, further comprising a substrate, wherein the trailing shield is disposed adjacent to the substrate, and wherein the control unit is configured to move the media moves in a counter-clockwise direction.

17. The magnetic recording device of claim 12, further comprising a substrate, wherein the second shield is disposed adjacent to the substrate, and wherein the control unit is configured to move the media moves in a clockwise direction.

18. The magnetic recording device of claim 12, further comprising a linear actuator, wherein the magnetic recording head is disposed on the linear actuator, and wherein the control unit is configured to move the linear actuator in a linear direction over the media such that the magnetic recording head moves in a radial direction with respect to the media.

19. A magnetic recording device, comprising:
a magnetic recording head, the magnetic recording head comprising:
a perpendicular magnetic recording (PMR) write head comprising:
a trailing shield disposed at a media facing surface (MFS);
a main pole disposed adjacent to the trailing shield at the MFS; and
a leading shield disposed adjacent to the main pole opposite the trailing shield at the MFS; and
a read head disposed adjacent to the write head, the read head comprising:
a first shield disposed at the MFS, the first shield being disposed adjacent to the leading shield;
a second shield disposed at the MFS; and
a magnetic sensor disposed between the first shield and the second shield at the MFS,
wherein:
the read head is spaced a distance of about 5 μm to about 20 μm from the PMR write head such that the magnetic recording head is controllable to write data to a media using the PMR write head and read verify the data using the read head, and
the magnetic recording head is tilted to a glide angle of about 80 micro-radians with respect to the media.

20. The magnetic recording device of claim 19, wherein the read head is disposed closer to the media than the PMR write head.

21. The magnetic recording device of claim 19, further comprising a third shield disposed between the write head and the read head, wherein the third shield has a height greater than or equal to a height of the first shield and the second shield, and wherein one or more of a position between the PMR write head and the read head, a width, a height, a thickness, and a permeability of the third shield is selected to create a null region.

22. The magnetic recording device of claim 19, wherein a central axis of the main pole is aligned with a central axis of the magnetic sensor.

23. The magnetic recording device of claim 19, further comprising a control unit and a substrate, wherein the trailing shield is disposed adjacent to the substrate, and wherein the control unit is configured to move the media moves in a counter-clockwise direction.

24. The magnetic recording device of claim 19, further comprising a control unit and a substrate, wherein the second shield is disposed adjacent to the substrate, and wherein the control unit is configured to move the media moves in a clockwise direction.

25. The magnetic recording device of claim 19, further comprising a control unit and a linear actuator, wherein the magnetic recording head is disposed on the linear actuator, and wherein the control unit is configured to move the linear actuator in a linear direction over the media such that the magnetic recording head moves in a radial direction with respect to the media.

* * * * *